US012560005B2

(12) United States Patent
Buchet

(10) Patent No.: US 12,560,005 B2
(45) Date of Patent: Feb. 24, 2026

(54) LONG THROW LATCH

(71) Applicant: Rohr, Inc., Chula Vista, CA (US)

(72) Inventor: Damien Buchet, Toulouse (FR)

(73) Assignee: ROHR, INC., Chula Vista, CA (US)

( * ) Notice: Subject to any disclaimer, the term of this patent is extended or adjusted under 35 U.S.C. 154(b) by 107 days.

(21) Appl. No.: 18/461,071

(22) Filed: Sep. 5, 2023

(65) Prior Publication Data

US 2024/0076917 A1 Mar. 7, 2024

(30) Foreign Application Priority Data

Sep. 5, 2022 (EP) .................................... 22306311

(51) Int. Cl.

*E05C 3/08* (2006.01)
*E05C 3/04* (2006.01)
*F01D 25/24* (2006.01)

(52) U.S. Cl.

CPC ................ *E05C 3/08* (2013.01); *E05C 3/045* (2013.01); *F01D 25/24* (2013.01)

(58) Field of Classification Search

CPC .......... E05C 3/08; E05C 3/045; E05C 19/145; E05C 19/14; E05C 19/12; E05B 41/00; E05B 15/0086; E05B 65/0817; F01D 25/24; F02K 1/766; B64D 29/06; Y10T 292/0813; Y10T 292/216; Y10T 292/0917; Y10S 292/49

See application file for complete search history.

(56) References Cited

U.S. PATENT DOCUMENTS 2,477,472 A * 7/1949 Wright .................. E05C 19/145
292/DIG. 31
2,695,803 A * 11/1954 Mills ..................... E05C 19/145
292/DIG. 31

(Continued)

FOREIGN PATENT DOCUMENTS

BR PI0812004 A2 * 11/2014 ........... E05C 19/145
FR 981093 A * 5/1951 ........... E05C 19/145

(Continued)

OTHER PUBLICATIONS

FR981093 Espacenet machine translation description (Year: 2024).*
European Search Report for Application No. 22306311.6, mailed Feb. 15, 2023, 10 pages.

*Primary Examiner* — Steven A Tullia
(74) *Attorney, Agent, or Firm* — CANTOR COLBURN LLP

(57) ABSTRACT

A latch mechanism for joining two portions of a gas turbine engine. The latch mechanism is moveable between an open and a closed position and includes a first member configured to be attachable to a first portion of a gas turbine engine and a second member pivotally attached to the first member. The first member is attached to the second member at a first position. The latch mechanism also includes a handle pivotally attached to the second member that is attached to the second member at a second position, and third member pivotally attached to the second member. The third member is attached to the second member at a third position, the third position being between the first position and the second position, and wherein the third member comprises securing means for securing the third member to a second portion of a gas turbine engine.

19 Claims, 8 Drawing Sheets

(56) References Cited

U.S. PATENT DOCUMENTS

| | | | | | |
|---|---|---|---|---|---|
| 2,712,955 | A * | 7/1955 | Andrews | E05C 19/145 292/108 |
| 2,927,812 | A * | 3/1960 | Smith | E05C 3/122 292/DIG. 31 |
| 2,961,262 | A * | 11/1960 | Nockels | B62D 33/0273 296/57.1 |
| 4,159,137 | A * | 6/1979 | Richter | E05C 3/08 292/DIG. 60 |
| 4,531,769 | A * | 7/1985 | Glancy | E05C 19/14 292/DIG. 31 |
| 4,743,052 | A * | 5/1988 | Stammreich | E05C 19/145 292/113 |
| 4,768,815 | A | 9/1988 | Harmon | |
| 4,858,970 | A * | 8/1989 | Tedesco | E05C 19/145 292/DIG. 31 |
| 5,620,212 | A * | 4/1997 | Bourne | E05C 19/145 292/DIG. 31 |
| 5,984,382 | A | 11/1999 | Bourne et al. | |
| 6,036,238 | A * | 3/2000 | Lallament | E05C 19/145 292/DIG. 31 |
| 6,343,815 | B1 | 2/2002 | Poe | |
| 10,137,996 | B2 | 11/2018 | Mellor | |
| 11,326,378 | B2 | 5/2022 | Hedges et al. | |
| 2016/0347465 | A1 | 12/2016 | Mellor | |
| 2017/0101811 | A1 | 4/2017 | Parsell, Jr. et al. | |
| 2018/0128028 | A1 | 5/2018 | Hernandez | |
| 2024/0327010 | A1* | 10/2024 | McMahan | E05C 19/145 |

FOREIGN PATENT DOCUMENTS

| | | | | |
|---|---|---|---|---|
| GB | 633301 | A * | 12/1949 | E05C 19/145 |
| GB | 699929 | A * | 11/1953 | E05C 19/14 |
| GB | 2189539 | A * | 10/1987 | E05C 19/145 |
| GB | 2185778 | B * | 2/1990 | E05C 19/145 |
| GB | 2189539 | B * | 12/1990 | E05C 19/145 |

* cited by examiner

LONG THROW LATCH

CROSS REFERENCE TO RELATED APPLICATION

This application claims priority to European Patent Application No. 22306311.6 filed Sep. 5, 2022, the entire contents of which is incorporated herein by reference.

TECHNICAL FIELD

This invention relates to relates generally to latches, and particularly to latches having a long throw suitable for use in securing thrust reversers.

BACKGROUND

Modern aircraft gas turbine engines may include a nacelle configured to house the engine and other auxiliary systems, and which provides an aerodynamic surface for flight. The nacelle may include one or more sections associated with particular sections of the gas turbine engine. For example, the nacelle may have a thrust reverser, comprising first and second thrust reverser portions. The first and second thrust reverser portions may be configured to be able to be opened so as to provide access to internal gas turbine engine components to facilitate gas turbine engine inspection and/or maintenance. For example, the thrust reverser may include two halves, both of which are hinged doors that can be opened to provide access to the gas turbine engine internals.

With such sections of the nacelle being moveable relative to one another, it is necessary to be able to secure them in a closed position. On such way is to provide one or more latches on the desired sections, that are capable of holding the required sections closed. Modern developments in gas turbine engines have led to an increased complexity, and increased number/size of components such as seals (such as aerodynamic or fire seals) that are required between the sections of the nacelle to be secured shut. In such cases, the latches are required to be able to overcome the seal stiffness during the latch closing procedure.

As such, there is increased resistance encountered during the closing procedure, which makes it difficult to bring the sections of the nacelle close enough by hand so that the latch can reach across the gap between the nacelle sections, and engage the opposing section to then close the sections together. This problem is particularly apparent in typical latches, which historically have relatively small "reaches"—i.e. only a short distance between their fully open position and their closed positions. In these situations, other devices such as "come-along" devices (such as additional belts or the like) may be used to initially bring the nacelle portions close enough such that the latch can reach across the gap in its fully open position, engage, and subsequently shut.

There is therefore a need for an improved latch system that overcomes the above issues.

SUMMARY

In a first aspect, there is provided a latch mechanism for joining two portions of a gas turbine engine. The latch mechanism is moveable between an open and a closed position. The latch mechanism comprises: a first member configured to be attachable to a first portion of a gas turbine engine; a second member pivotally attached to the first member, wherein the first member is attached to the second member at a first position; a handle pivotally attached to the second member, wherein the handle is attached to the second member at a second position; a third member pivotally attached to the second member, wherein the third member is attached to the second member at a third position, the third position being between the first position and the second position, and wherein the third member comprises securing means for securing the third member to a second portion of a gas turbine engine; and a locking device comprising retaining means configured to retain the latch mechanism in its closed position.

In general, each of the second member, third member, and handle each have an open and a closed position. In their open positions, each of the second member, third member, and handle may be able to be moved. When the second member, third member and handle are all in their respective closed position, then it may be said that the latch mechanism is in its closed position, and thereby retains each of the first member, second member, third member, and handle in a fixed position relative to one another, and by proxy, retains objects attached to the first member and third member in fixed relation to one another.

The foldable nature of the latch mechanism provides both a good mechanical advantage (by virtue of the lever arm provided by the foldable handle) and a large travel between its fully open and closed positions, around 3 to 4 times further the gap than compared to state-of-the-art latches. Therefore, the latch mechanism may obviate the need for the use of any further Come Along Device.

Further, the use of a first member provides an offset attachment link such that the linkage does not cross the connection between the latch mechanism and the portion of the gas turbine engine to which it may be attached, thereby allowing for straight linkages (i.e. there is no need for a kink in any of the first, second or third members), as well as for the optimization of product weight.

In addition, the volume of the overall package of the latch mechanism is similar to existing latches, therefore such a latch mechanism could be integrated with practically no changes to existing architectures.

The retaining means may comprise a hook, configured to engage a locking pin of the first member, and the retaining means may be configured to engage with the locking pin when the latch mechanism is in the closed position. This provides a simple and reversable attachment between the latch mechanism and a portion of the gas turbine engine that is to be closed.

The locking device may further comprise a means for disengaging the retaining means, thereby releasing the latch mechanism from the closed position. The handle may be lockable in an open position by the locking device. In its open position, the handle may be locked in a rotationally fixed position compared to the second member.

The means for disengaging may be further configured to unlock the handle from its open position. In this way, a single push can be used to both release the handle at opening and fold back the extension after closing, and the same disengagement means may be used to unlock the latch, and unlock the handle from its fully open position.

In the closed position, the first member, second member, third member and handle may be configured such that, the first member, second member, third member and handle may be at least partially nested within one another. This allows for a smaller envelope of the latch mechanism, as well as a reduction in potential pinch points in the mechanism.

The first position may be located at a first end of the second member, and the second position is at a second end of the second member, the second end being opposite to the first end.

The second member and the third member may be configured such that, when they are in the closed position, the attachment between the second member and the third member at the third position is over centred with respect to the first member and the securing portion. This provides a stable position of the second member that can be utilised during the opening/closing operation of the latch.

Whilst the latch mechanism may find use in a number of different applications, it may find particular use in the context of a thrust reverser.

Therefore, in a second aspect, there is provided a thrust reverser comprising a first portion; a second portion, wherein the first portion and second portion are moveable relative to one another between an open position and a closed position. The first portion comprises a latch mechanism according to the first aspect, wherein the first member is attached to the first portion; and the securing means is configured to be engageable with the second portion such that, when the securing means is engaged with the second portion, movement of the latch mechanism to its closed position results in relative movement of the first and second portions to their closed position.

The second portion may comprise a pin that is engageable by the securing means of the latch mechanism. This again allows for a safe and easy method of engaging the second portion of the thrust reverser by the latch mechanism.

The first member may be rotationally fixed relative to the first portion, thereby improving ease of use of the latch mechanism.

As mentioned above, the latch mechanism may be utilised to move two portions of a gas turbine engine from an open position to a closed position.

Therefore, in a third aspect, there is provided a method of moving a first and a second portion of a gas turbine engine from an open position to a closed position using the latch mechanism of the first aspect, the method comprising: engaging the second portion of the gas turbine engine with the securing means of the latch mechanism; rotating the second member about the first member, thereby moving the first and second portion of the gas turbine engine into a closed position; rotating the handle about the second member from an open position to a closed position; engaging the retaining means, thereby retaining the latch mechanism and the first and second portion in the closed positions.

The closed position of the second member may be a stable position, thereby improving usability of the mechanism.

As mentioned above, the latch mechanism may be utilised to move two portions of a gas turbine engine from a closed position to an open position.

Therefore, in a fourth aspect, there is provided a method of moving a first and a second portion of a gas turbine engine from a closed position to an open position using the latch mechanism of the first aspect, the method comprising: disengaging the retaining means, rotating the handle about the second member from a closed position to an open position; rotating the second member about the first member, thereby bringing moving the first and second portion of the gas turbine engine into an open position; disengaging the second portion of the gas turbine engine from the securing means of the latch mechanism.

Of course, it is foreseen that the methods of the third aspect and the forth aspect would be equally usable with opening and closing a thrust reverser, such as the thrust reverser of the second aspect.

Advantageously, the latch mechanism described above may have a similar total envelope compared to known latch mechanisms. Therefore, they may be fitted onto existing systems in place of traditional latch mechanisms with little to no modification.

Therefore, according to a fifth aspect, there is provided a method of retrofitting the latch mechanism of the first aspect to a gas turbine engine comprising attaching the first member to a first portion of the gas turbine engine, and arranging the latch mechanism such that a second portion of the gas turbine engine is engageable by the securing means.

BRIEF DESCRIPTION OF THE DRAWINGS

Certain examples of the disclosure will now be described, by way of example only, with reference to the accompanying drawings, in which.

DETAILED DESCRIPTION

Whilst the description herein refers mainly to thrust reversers, and how the latch operates to secure a first and second portion of a thrust reverser casing closed with respect to one another, it will be appreciated that the latch assembly referred to herein might find other uses. For example, the latch assembly might be used to retain other portions of a nacelle relative to one another, or in any other use.

Figure 1A:
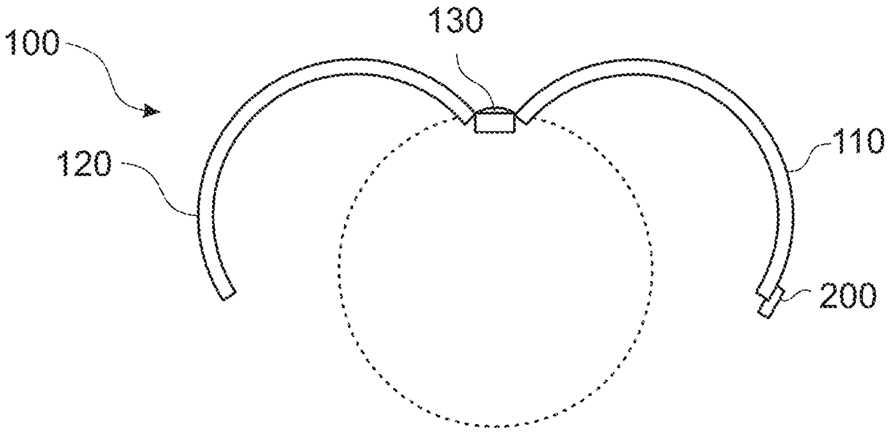
FIG. 1A shows a schematic illustration of a thrust reverser in an open position.
Figure 1B:
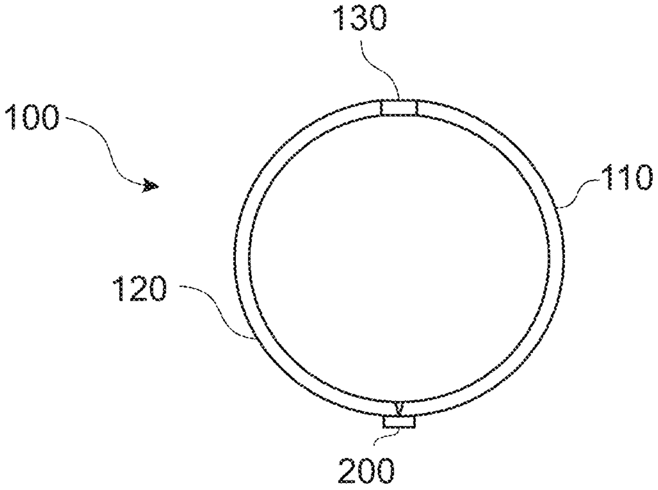
FIG. 1B shows a schematic illustration of a thrust reverser in a closed position.

FIGS. 1A and 1B show a schematic illustration of a thrust reverser 100 before closing, and in the closed position. As can be seen, the thrust reverser 100 may include one or more portions 110, 120 configured to be openable so as to provide access to internal components of the gas turbine engine for inspections and maintenance.

For example, the thrust reverser may comprise a first portion 110, and a second portion 120, and a latch mechanism 200. Each of the first and second portions 110, 120 may be movable from an open position to a closed position. One way that the first and second portions may be movable is that they may be rotatably mounted to the nacelle 130 of the gas turbine engine by one or more hinges. For example, as shown in FIGS. 1A and 1B, each of the first and second portions 110, 120 may be mounted to the nacelle 130 at or proximate a top edge of the respective portion by the hinges.

As used herein, "closed position" will be used to refer to the first and second portions 110, 120 in a position so as to form a portion of a substantially continuous exterior surface of the nacelle (e.g., when the first and second portions 110, 120 are positioned for flight). In such a position, the latch mechanism 200 may be used to secure the first and second portions 110, 120 in position relative to one another, and relative to the gas turbine engine/nacelle.

The "open position" refers to when the first and second portions 110, 120 are in a position other than the closed position (e.g., when the first and second portions are partially open, fully open, etc.).

As referred to above, whilst description herein will be explained with reference to first and second portions 110, 120 of the thrust reverser 100, the skilled person would recognize that the latch mechanism described herein would also be applicable in other situations. For example, the latch mechanism might find use in other cowl doors of a gas turbine engine (e.g., fan cowl doors, core cowl doors, etc.), access panels, etc. which are configured to open so as to permit access to internal components of the gas turbine engine or other equipment (e.g., industrial gas turbine engines, wind turbines, etc.).

Figure 2A:
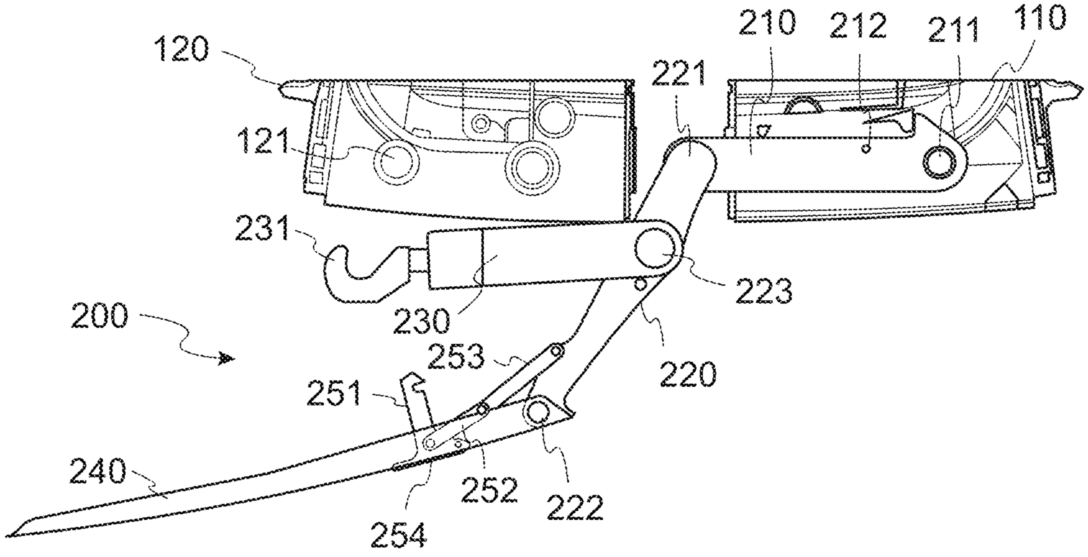
FIG. 2A shows an example latch mechanism.
Figure 2B:
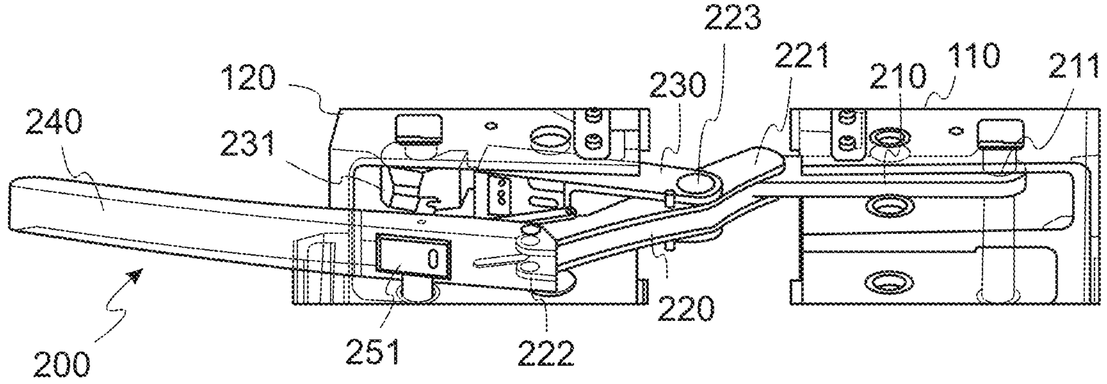
FIG. 2B shows a perspective view of the example latch mechanism of FIG. 2A.

An example latch mechanism 200 is shown in FIGS. 2A and 2B. As described above, latch mechanism 200 may be used to secure a first portion 110 and a second portion 120 in a closed position. In the example of FIGS. 2A and 2B, the latch mechanism 200 is used to secure a first portion of a thrust reverser 110 to a second portion of a thrust reverser 120 in the closed position.

In general, the latch mechanism 200 comprises a foldable mechanism configured to give maximum travel between its fully open and closed position, thereby being able to span a larger gap between the first and second portions that are to be joined, thereby removing the need for the use of a separate come along device. In addition, the foldable handle arrangement provides a longer lever arm, thereby providing a mechanical advantage when the latch is being closed, and resistance against the closing motion provided by internal seals and the like must be overcome.

In order to achieve such effects, the latch mechanism 200 comprises a first member 210, a second member 220, a third member 230, and a handle 240. Each of the second member 220, third member 230 and handle 240 are moveable between an open position and a closed position. When the second member, third member 230 and handle 240 are all in their respective closed position, then it may be said that the latch mechanism 200 is in its closed position, thereby retaining each of the first member 210, second member 220, third member 230, and handle 240 in a fixed position relative to one another.

The first member 210 is configured to be mounted to a first portion 110. For example, the first member 210 may be configured to be attached to the first portion 210 about a fixing 211 at or towards a first end of the first member 210. In order to ease operation of the mechanism, the first member 210 may be rotationally fixed, or at least have limited rotation relative to the first portion 110. The first member 210 acts as an offset attachment link, so as to move the attachment of the latch mechanism 200 to the first portion 110 away from the rotating parts of the latch mechanism 200.

Second member 220 is pivotally mounted with respect to the first member 210 about a first position 221. For example, a first end of the second member 220 may be pivotally connected to a second end of the first member 210 at a first position 221, thereby providing the second member 220 in rotational communication with the first member 210.

Handle 240 is pivotally mounted with respect to the second member 220 about a second position 222. For example, a first end of the handle 240 may be pivotally connected to a second end of the second member 220 at second position 222, thereby providing the handle in rotational communication with the second member 220.

The third member 230 is pivotally mounted with respect to the second member 220 about a third position 223, the third position 223 being between the first position 221 and the second position 222. For example, a first end of the third member 230 may be pivotally connected to the second member 220 at third position 223, thereby providing the third member in rotational communication with the second member 220.

The third member 230 further comprises securing means 231, the securing means 231 being configured to be able to engage with the second portion 120 of the thrust reverser, so as to secure the third member 231 to the second portion 120 of the thrust reverser. For example, securing means 231 may be a hook configured to engage with a pin 121 of the second portion 120.

As the third member 230 is pivotally mounted with respect to the second member 220, the third member 230 may be rotated about the second member 220 from a disengaged position (where it is not in contact with the second portion 120 of the thrust reverser) to an engaged position (where it is engaged with the second portion 120 of the thrust reverser). Further, as the second member 220 is pivotally mounted with respect to the first member 210, which is in turn configured to be mounted to the first portion 210 of the thrust reverser, the second member (and therefore the third member) may move relative to the first portion 210, thereby providing relative movement between the third member 230 and the first portion 210. Therefore, when the securing means 231 is engaged with the second portion 220, the latch mechanism 200 can move the second portion 220 relative to the first portion 210, for example, from an open position to a closed position.

Further, as the handle 240 is pivotally mounted with respect to the second member 220, the handle 240 may be used to control the above-mentioned relative movement between the first portion 110 and second portion 120.

The latch mechanism 200 may further include a locking device configured to retain the latch mechanism in a closed position, and/or release the handle from an open position, as detailed below.

For example, the locking device may comprise retaining means 251 configured to retain the latch mechanism 200 in a closed position. For example, retaining means 251 may be configured to engage with a fixing pin 212 of the first member 210 when the latch mechanism is in the closed position, thereby retaining the handle in fixed position with respect to the first member 210.

In general, the latch mechanism 200 is moveable between an open position, where the first member 210, second member 220, third member 230, and handle 240 are free to move relative to each other, and a closed position, where the first member 210, second member 220, third member 230, and handle 240 are retained in position relative one another. In the closed position, as the first member 210, second member 220, third member 230, and handle 240 are retained in position relative one another, and so are objects that are coupled to the first member 210, and objects engaged with the securing means 231 of the third member 230. In the example of FIGS. 2A and 2B, when the latch mechanism 200 is in the closed position, the first portion 110 of the thrust reverser may be secured in relation to the second portion 120, for example, so that the thrust reverser is retained in the closed position.

As can be more clearly seen in FIG. 2B, the first member 210, second member 220, third member 230, and handle 240 are provided such that they may at least partially nest within one another when the latch mechanism 200 is in the closed position, thereby minimising the envelope of the latch mechanism, as well as preventing a kink shape in the mechanism.

For example, the first member 210 may comprise a single arm. The second member 220 may comprise two arms spaced apart from one another such that each arm may lie on opposing sides of the first member 210. In this way, the first member 210 may fit within the gap provided between the two arms of the second member 220.

Similarly, the third member 230 may comprise two arms spaced apart from each other such that each arm may be attached on opposing sides of the two arms of the second member 220. In this way, both arms of the second member 220 may fit within the gap provided between the two arms of the third member 230.

Similarly, the handle 240 may comprise two arms spaced apart from each other such that each arm may be attached on opposing sides of the two arms of the second member 220. In this way, both arms of the second member 220 may fit within the gap provided between the two arms of the handle 240. Further, this gap may be sized such that it is large enough so that both arms of the third member 230 may fit within the gap provided by the arms of the handle.

In addition, the utilisation of the first member 210 as an offset attachment link moves the attachment of the latch mechanism 200 to the first portion 110 away from the rotating parts of the latch mechanism 200. In this way, the attachment between the latch mechanism 200 and the first portion 110 may be moved to fixing 211, which is remote from the connection between the second member 220 and the third member 230 at third position 223. This allows for the second member 220 to be shaped so as to avoid the fixing 211, thereby avoiding a potential kink position. In contrast, if the second member 220 were connected directly to the first portion 110 at the first position 221, then the third member 230 would have to overlap this fixing when the latch mechanism is in the closed position.

FIGS. 3A, 3B, 3C, and 3D show how the latch mechanism 200 may be moved from an open to a closed position, and therefore used to move first and second portions of a thrust reverser to a closed position.

Figure 3A:
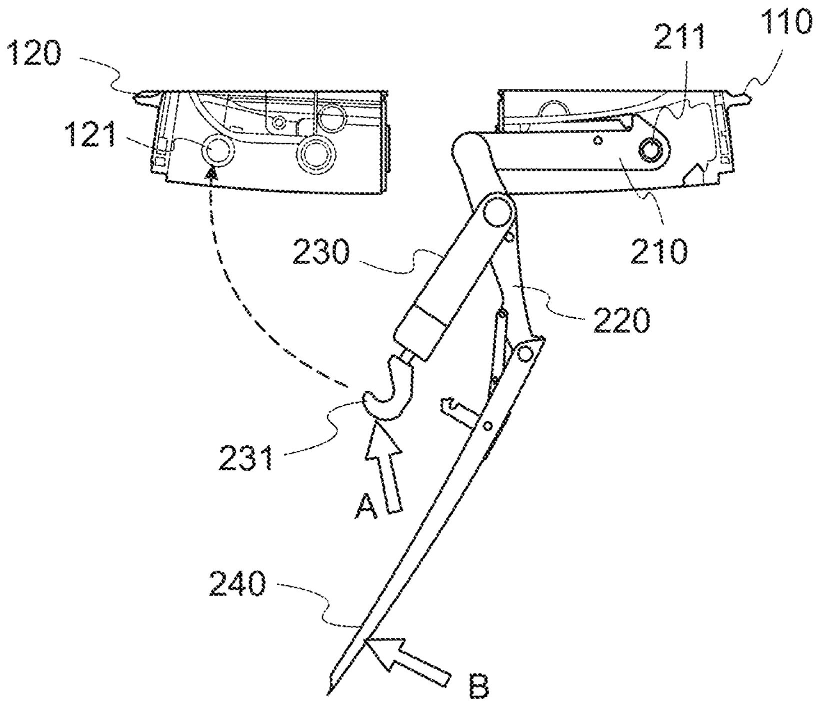
FIGS. 3A, 3B, 3C and 3D show how a latch mechanism may be moved from an open to a closed position, and therefore used to move first and second portions of a thrust reverser to a closed position.
Figure 3B:
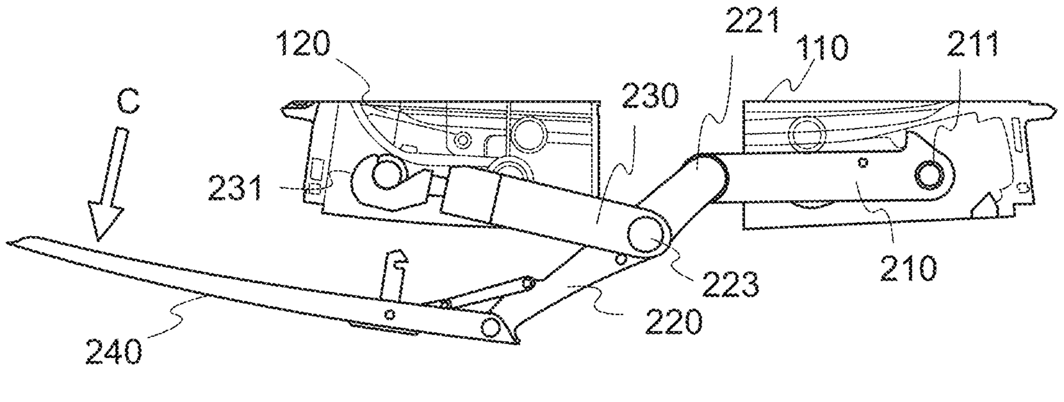

As can be seen in FIGS. 3A and 3B, firstly, the handle 240 and third member 230 may be operated so as to bring the securing means 231 into a position such that the securing means 231 can engage the second portion 120, for example, so as to hook around the pin 121. In this way, the third portion 230 may be moved in direction A as the handle 240 is moved in direction B so as to move the securing means 231 towards the pin 121, into the position shown in FIG. 3B.

Then, as shown in FIG. 3B, once the securing means 231 is engaging the second portion 120, the handle 240 may be moved in the opposite direction, thereby bringing the first portion 110 and the second portion 120 closer. For example, the handle 240 may be moved in direction C. The movement of the handle in direction C pivots the second member 220 about the first position 221. Due to the offset between the connection between the first position 221 and the third position 223 (and therefore the offset between the connection of the first member 210 and the second member 220, and the second member 220 and the third member 230), this rotation of the second member 220 results in a movement of the third member 230 towards the first member 210.

As the first member 210 is secured to the first portion 110 by fixing 211, and the third member 230 is engaging the second portion 120 by way of securing means 231 interacting with pin 121, this relative movement between the third member 230 and the first member 210 results in a relative movement between the first portion 110 and the second portion 120.

Figure 3C:
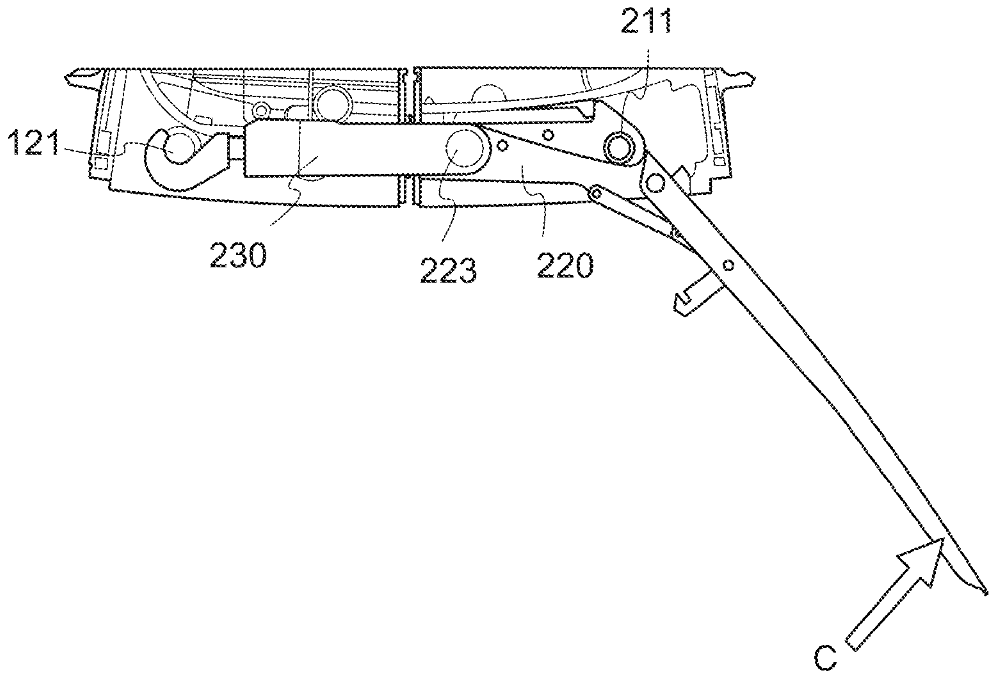

The handle 240 may be moved in direction C until the first and second portions 110, 120 of the thrust reverser are in the closed position, and the second and third members 220, 230 are in the closed position, as seen in FIG. 3C. The first, second and third members 210, 220, 230 may be configured such that this closed position is a stable, secured position. For example, in this closed position, the connection between the second member 220 and the third member 230 at the second position 223 is over centred compared to the pin 121 and the fixing 211 of the first portion 210, and additionally, there is provided loaded contact between the second member 220 and the fixing 211. This position is therefore a stable position.

Figure 3D:
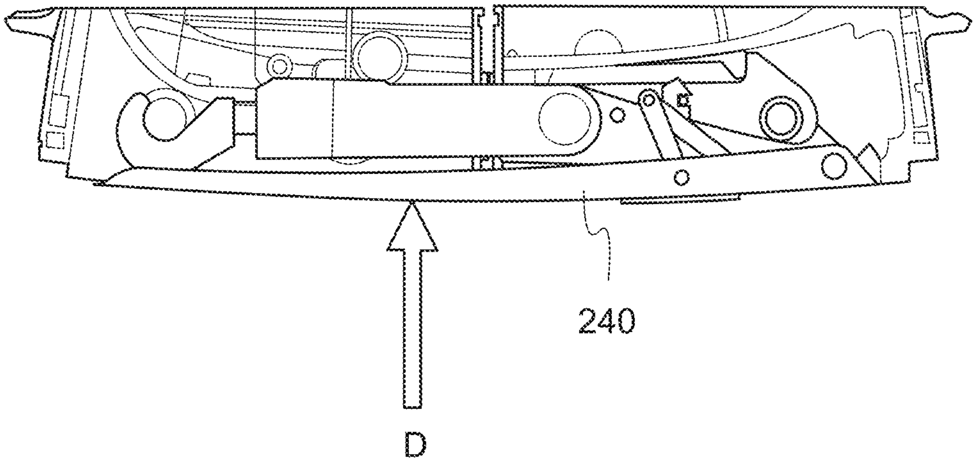

The handle 240 may then be moved to its closed position, as seen in FIG. 3D, thereby providing the latch mechanism 200 (as well as the thrust reverser) in its fully closed position.

When the latch mechanism 200 is in the closed position, the handle 240 may be configured to be retained in the closed position.

Figure 4A:
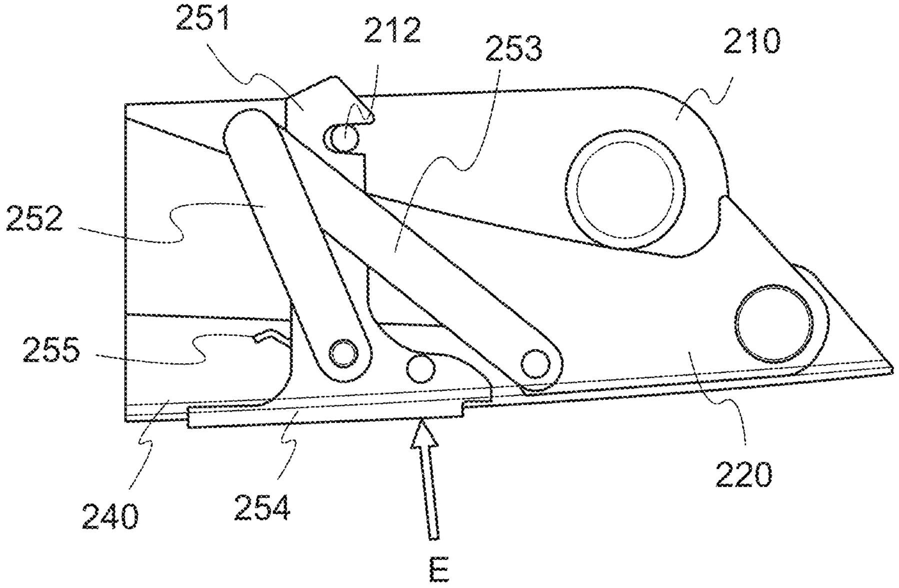
FIGS. 4A, 4B, 4C, and 4D show in more detail a locking device for a latch mechanism.

For example, the handle 240 may be retained relative to the first member 210 by a locking device, an example of which may be seen in more detail in FIGS. 4A, 4B, 4C, and 4D. FIG. 4A shows in more detail the locking device, when the latch mechanism 200 is in its closed position.

In general, the locking device may comprise retaining means 251, first and second links 252, 253, and disengagement means 254. As can be seen, the retaining means 251 may biased towards a fixing pin 212 of the first member 210 by a biasing member 255 such that, in the absence of other forces, the retaining means 251 engages with the fixing pin 212 when the latch mechanism is in the closed position, thereby retaining the latch mechanism as a whole in the closed position. The retaining means 251 is disengageable by a disengagement means 254. For example, the retaining means 251 may be moveable by a user, for example by the user pressing the button 254 with a motion along direction E, thereby moving the retaining means and disengaging the first member and allowing the latch mechanism 200 to open.

The handle 240 may be configured such that it is lockable in an open position in use, which may ease operation of the latch mechanism. For example, the retaining means 251 may be further connected to the second member 220 by way of first and second links 252, 253 which are explained in more detail with reference to FIGS. 4B, 4C and 4D.

Figure 4B:
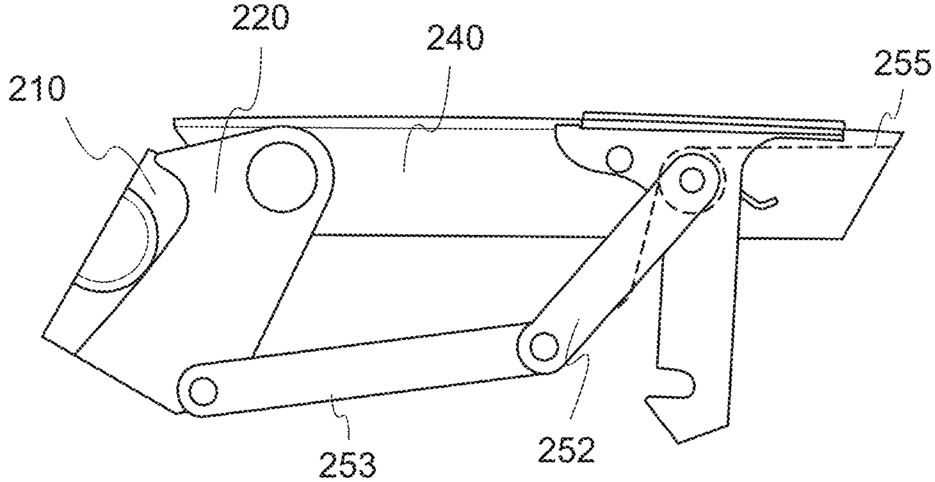

FIG. 4B shows the handle 240 during movement to an open position, following the disengaging of the retaining means 251 with the first member 210, for example, by depressing the button 254. As can be seen, the first link 252 may be biased by biasing member 255 towards the handle 240.

Figure 4C:
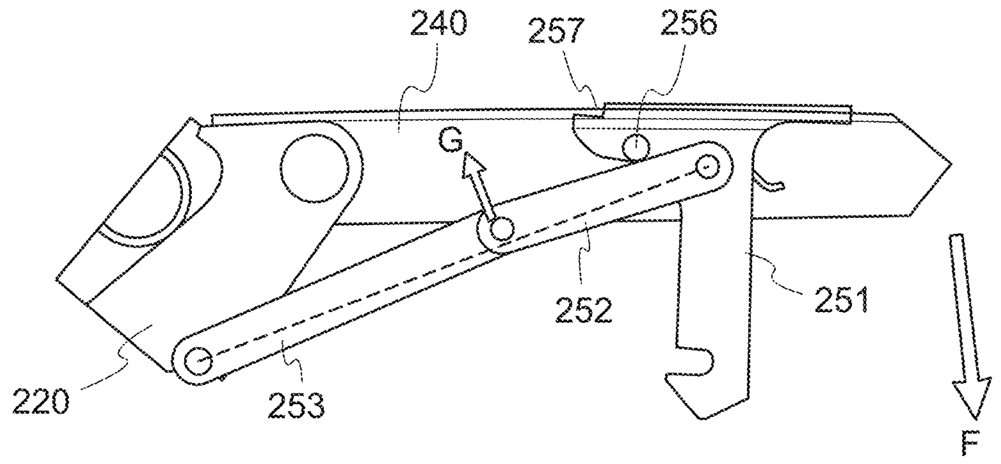

Once the handle is in the fully open position, as can be seen in FIG. 4C, the first and second links 252, 253 are pushed into an over centred position. In this way, the link between the first link 252 and second link 253 is biased by biasing member 255 past an axis drawn between the respective connection of the first link 252 and the biasing member 251, and the connection between the second link 253 and the second member 220. Therefore, any force applied to the distal end of the handle (i.e. in the direction of F in FIG. 4C) would result in the movement of first and second links 252, 253 towards the handle (i.e. in direction G). However, the first link 252 may be prevented from moving further in this direction, for example, by manual stop 256 located on the retaining means. Further, the retaining means may be prevented from moving in a similar direction by a physical point of contact between the handle 240 and the retaining means 251. Therefore, a force applied in direction F on the handle 240 may not result in a movement of the handle 240 compared to the remainder of the latch mechanism.

Figure 4D:
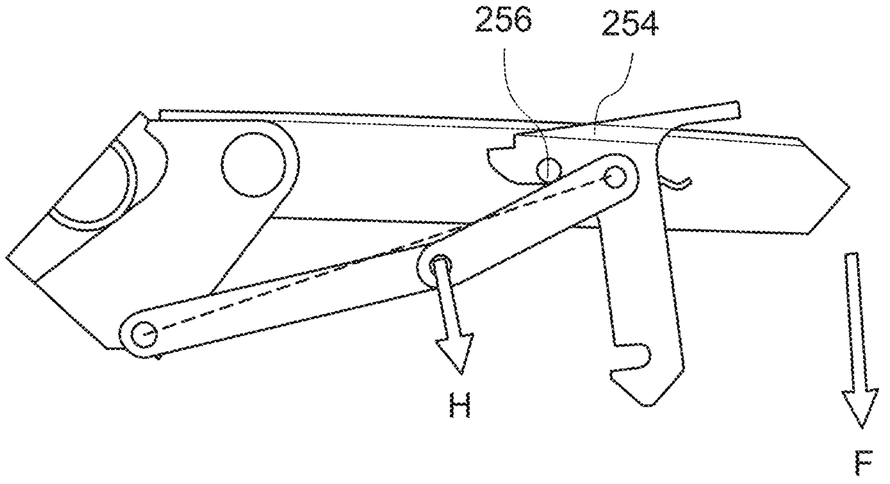

As shown in FIG. 4D, the handle 240 may be unlocked from its open position. For example, by depressing the button 254 of the retaining means 251, the mechanical stop 256 may push the first link 252 so as to break the over-centred position of the first and second links 252, 253. Then, any movement of the handle 240 in the direction F will result in a movement of the connection between the first and second links 252, 253 in direction H, thereby allowing the handle 240 so as to be moved towards its closed position with respect to first, second and third members 210, 220, 230.

FIGS. 5A, 5B, 5C and 5D show how the latch mechanism 200 may be moved from closed to an open position, and therefore used to move first and second portions of a thrust reverser to an open position. As can be seen, the movement is essentially the process of FIGS. 3A, 3B, 3C, and 3D reversed.

Figure 5A:
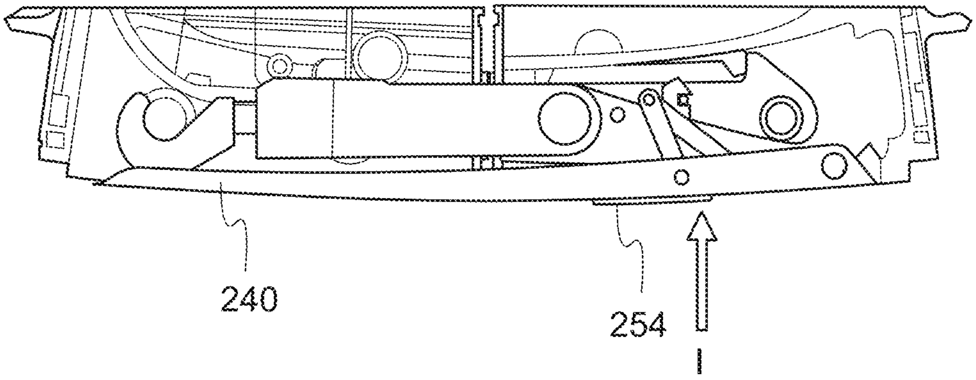
FIGS. 5A, 5B, 5C and 5D show how a latch mechanism may be moved from a closed to an open position, and therefore used to move first and second portions of a thrust reverser to an open position.
Figure 5B:
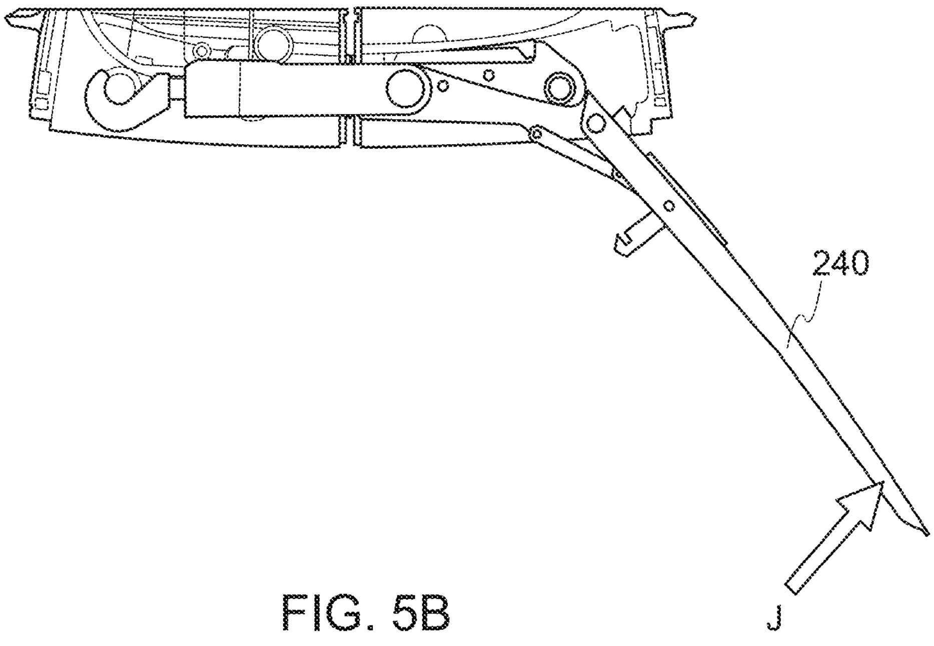

As can be seen in FIG. 5A, the disengagement means 254 (for example, button 254) may disengage the retaining means 251, thereby releasing the handle 240. For example, the user may depress button 254 with a motion along direction I. Then, as can be seen in FIG. 5B, the handle may be extended in direction J, at which point the handle may be locked in position, for example, by the locking mechanism discussed above.

Figure 5C:
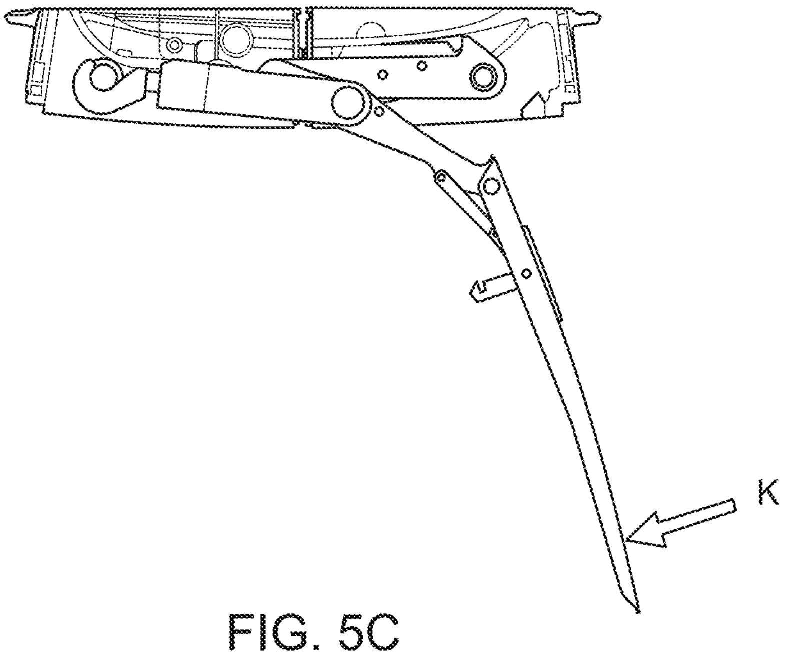
Figure 5D:
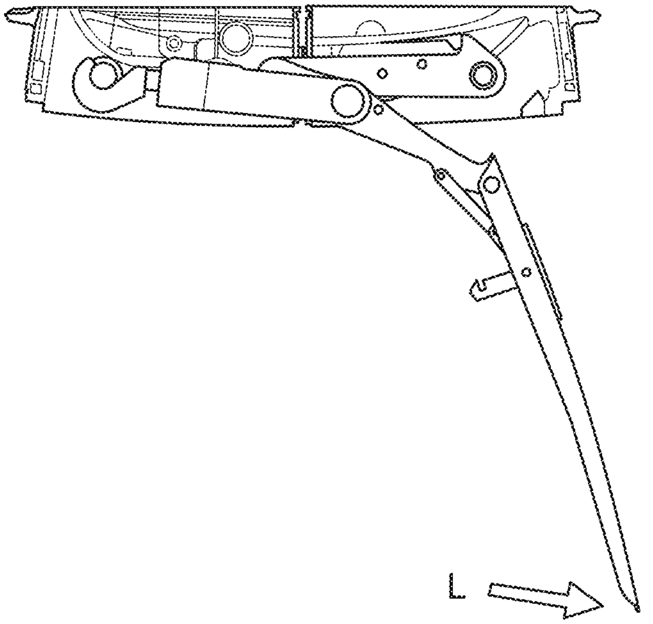

The handle may then be moved in the opposite direction, direction K seen in FIG. 5C, thereby rotating the second member 220, and the third member 230 from their respective closed position to respective open positions. This movement may break the over centred position of the second position 223 (between the second member 220 and third member 230) referred to above, at which point the resilient forces of the seals may bias the second member 220 and third member 230 to further open the thrust reverser first and second portions, at which point the user may need to apply a force in the direction of L so as to retain a controlled opening of the latch mechanism. Once fully opened, the securing means 231 may be disengaged, thereby allowing for opening of the thrust reverser.

As outlined above, the latch mechanism provides both a good mechanical advantage (by virtue of the lever arm provided by the foldable handle) and a large travel between the fully open and closed positions, which allows for closing of thrust reverser halves from 3 to 4 times the gap than compared to state-of-the-art latches. Therefore, the latch mechanism may obviate the need for the use of any further Come Along Device.

Further, the arrangement of the linkage does not cross the connection between the latch mechanism and the portion of the thrust reverser to which it may be attached, thereby allowing for straight linkages (i.e. there is no need for a kink in any of the first, second or third members), as well as for the optimization of product weight.

The volume of the overall package of the latch mechanism is additionally similar to existing latches, and therefore such a latch mechanism could be integrated with practically no changes to existing architectures. In addition, a single push can be used to both release the handle at opening and fold back the extension after closing (i.e. the same disengagement means may be used to unlock the latch, and unlock the handle from its fully open position). This results in a simple operation that is similar to existing products, whilst removing the need for a separate Come Along Device, which greatly simplifies the closing operation.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is not intended that the present disclosure be limited to the particular embodiment disclosed as the best mode contemplated for carrying out this present disclosure, but that the present disclosure will include all embodiments falling within the scope of the claims.

The invention claimed is:

1. A latch mechanism for joining two portions of a gas turbine engine, the latch mechanism being moveable between an open and a closed position, the latch mechanism comprising:

a first member having a first end and a second end, the first member configured to be attachable to a first portion of a gas turbine engine about a fixing near the first end;

a second member pivotally attached to the first member, wherein the second end of the first member is attached to the first end of the second member at a first position;

a handle pivotally attached to the second member, wherein the handle is attached to the second member at a second position;

a third member pivotally attached to the second member, wherein the third member is attached to the second member at a third position, the third position being between the first position and the second position, and wherein the third member comprises securing means for securing the third member to a second portion of a gas turbine engine; and a locking device comprising retaining means configured to retain the latch mechanism in its closed position.

2. The latch mechanism of claim 1, wherein the retaining means comprises a hook, wherein the hook is configured to engage with a locking pin of the first member when the latch mechanism is in its closed position.

3. The latch mechanism of claim 1, wherein the locking device further comprises a means for disengaging the retaining means, configured to release the latch mechanism from its closed position.

4. The latch mechanism of claim 1, wherein the first member, second member, third member and handle are configured such that, when the latch mechanism is in the closed position, the first member, second member, third member and handle are at least partially nested within one another.

5. The latch mechanism of claim 1, wherein the first position is located at a first end of the second member, and the second position is at a second end of the second member, the second end being opposite to the first end.

6. The latch mechanism of claim 1, wherein the second member and the third member are configured such that, when they are in their closed positions, the attachment between the second member and the third member at the third position is over centred with respect to the fixing and the securing means.

7. A thrust reverser comprising:

the latch mechanism as claimed in claim 1; and the second portion, wherein the latch mechanism and the second portion are moveable relative to one another between an open position and a closed position;

wherein:

the first member is attached to the first portion; and the securing means is configured to be engageable with the second portion such that, when the securing means is engaged with the second portion, movement of the latch mechanism to its closed position results in relative movement of the latch mechanism and the second portion to their closed positions.

8. The thrust reverser of claim 7, wherein the second portion comprises a pin that is engageable by the securing means of the latch mechanism.

9. The thrust reverser of claim 7, wherein the first member is rotationally fixed relative to the latch mechanism.

10. A method of moving portions of a gas turbine engine from an open position to a closed position using the latch mechanism as claimed in claim 1, the method comprising:

engaging the second portion of the gas turbine engine with the securing means of the latch mechanism;

rotating the second member about the first member, thereby moving the first and second portion of the gas turbine engine into a closed position;

rotating the handle about the second member from an open position to a closed position; and engaging the retaining means, thereby retaining the latch mechanism and the first and second portion in the closed positions.

11. The method of claim 10, wherein, when the closed position of the second member is a stable position.

12. A method of moving portions of a gas turbine engine from a closed position to an open position using the latch mechanism as claimed in claim 1, the method comprising:

disengaging the retaining means, rotating the handle about the second member from a closed position to an open position;

rotating the second member about the first member, thereby bringing moving the first and second portion of the gas turbine engine into an open position; and disengaging the second portion of the gas turbine engine from the securing means of the latch mechanism.

13. A method of retrofitting the latch mechanism of claim 1 to a gas turbine engine comprising:

attaching the first member to the first portion of the gas turbine engine; and arranging the latch mechanism such that the second portion of the gas turbine engine is engageable by the securing means.

14. A latch mechanism for joining two portions of a gas turbine engine, the latch mechanism being moveable between an open and a closed position, the latch mechanism comprising:

a first member configured to be attachable to a first portion of a gas turbine engine;

a second member pivotally attached to the first member, wherein the first member is attached to the second member at a first position;

a handle pivotally attached to the second member, wherein the handle is attached to the second member at a second position;

a third member pivotally attached to the second member, wherein the third member is attached to the second member at a third position, the third position being between the first position and the second position, and wherein the third member comprises securing means for securing the third member to a second portion of a gas turbine engine; and a locking device comprising retaining means configured to retain the latch mechanism in its closed position;

wherein the locking device further comprises a means for disengaging the retaining means, configured to release the latch mechanism from its closed position;

wherein the handle is lockable in an open position by the locking device.

15. The latch mechanism of claim 14, wherein the means for disengaging is further configured to unlock the handle from its open position.

16. The latch mechanism of claim 14, wherein the retaining means comprises a hook, wherein the hook is configured to engage with a locking pin of the first member when the latch mechanism is in its closed position.

17. The latch mechanism of claim 14, wherein the first member, second member, third member and handle are configured such that, when the latch mechanism is in the closed position, the first member, second member, third member and handle are at least partially nested within one another.

18. The latch mechanism of claim 14, wherein the first position is located at a first end of the second member, and the second position is at a second end of the second member, the second end being opposite to the first end.

19. The latch mechanism of claim 14, wherein the second member and the third member are configured such that, when they are in their closed positions, the attachment between the second member and the third member at the third position is over centred with respect to the fixing and the securing means.

* * * * *